United States Patent
Takeshita

(10) Patent No.: US 7,432,961 B2
(45) Date of Patent: Oct. 7, 2008

(54) ELECTRONIC CAMERA HAVING WHITE BALANCE FUNCTION

(75) Inventor: Tetsuya Takeshita, Yokohama (JP)

(73) Assignee: Nikon Corporation, Tokyo (JP)

( * ) Notice: Subject to any disclaimer, the term of this patent is extended or adjusted under 35 U.S.C. 154(b) by 547 days.

(21) Appl. No.: 10/739,224

(22) Filed: Dec. 19, 2003

(65) Prior Publication Data
US 2004/0246348 A1 Dec. 9, 2004

(30) Foreign Application Priority Data
Jan. 8, 2003 (JP) ............................. 2003-002211

(51) Int. Cl.
H04N 9/73 (2006.01)
(52) U.S. Cl. ............... 348/227.1; 348/223.1; 348/225.1
(58) Field of Classification Search ............. 348/223.1, 348/225.1, 227.1, 229.1
See application file for complete search history.

(56) References Cited

U.S. PATENT DOCUMENTS

| | | | |
|---|---|---|---|
| 5,155,635 A | | 10/1992 | Kakiuchi |
| 5,617,139 A | * | 4/1997 | Okino ..................... 348/223.1 |
| 5,805,213 A | * | 9/1998 | Spaulding et al. ........ 348/222.1 |
| 2002/0106206 A1 | * | 8/2002 | Takeshita .................... 396/429 |
| 2003/0058351 A1 | * | 3/2003 | Maeda ..................... 348/223.1 |
| 2003/0076424 A1 | * | 4/2003 | Minakuti et al. .......... 348/223.1 |
| 2003/0081140 A1 | * | 5/2003 | Furukawa ................... 348/362 |

FOREIGN PATENT DOCUMENTS

| | | |
|---|---|---|
| JP | U-61-154083 | 9/1986 |
| JP | A-03-291086 | 12/1991 |
| JP | A 8-186828 | 7/1996 |
| JP | A 2000-156869 | 6/2000 |

* cited by examiner

*Primary Examiner*—James M. Hannett
*Assistant Examiner*—Kelly Jerabek
(74) *Attorney, Agent, or Firm*—Oliff & Berridge, PLC

(57) ABSTRACT

An electronic camera of the present invention has an image pickup part, an ambient light colorimetric part, an operation member, a colorimetric calculation part, and a white balance adjustment part. The image pickup part captures an optical image through a photo-taking lens to generate color image data. The ambient light colorimetric part measures color of ambient light without passing through the photo-taking lens. The operation member receives an instruction for the colorimetric timing of ambient light from a user. The colorimetric calculation part obtains the colorimetric result from the ambient light colorimetric part in synchronization with the colorimetric timing, and calculates and stores color gain bringing the colorimetric result near to achromatic color. The white balance adjustment part performs white balance adjustment of image data in accordance with the stored color gain. The structure of the electric camera like this allows preset white balance to be executed in freer timing.

6 Claims, 4 Drawing Sheets

Fig. 3

| Bs/Gs \ Rs/Gs | 200 | 190 | 180 | 170 | 160 | 150 | 140 | 130 | 120 | 110 | 100 | 90 | 80 | 70 | 60 | 50 | 40 | 30 | 20 | 10 | 0 |
|---|---|---|---|---|---|---|---|---|---|---|---|---|---|---|---|---|---|---|---|---|---|
| 200 | 10 | 10 | 10 | 10 | 10 | 10 | 10 | 10 | 10 | 9 | 8 | 7 | 6 | 5 | 4 | 3 | 3 | 4 | 5 | 6 | 7 |
| 190 | 10 | 10 | 10 | 10 | 10 | 10 | 10 | 10 | 9 | 8 | 7 | 5 | 5 | 4 | 3 | 3 | 3 | 3 | 4 | 5 | 6 |
| 180 | 10 | 10 | 10 | 10 | 10 | 10 | 10 | 9 | 8 | 7 | 6 | 5 | 4 | 3 | 3 | 2 | 2 | 2 | 3 | 4 | 5 |
| 170 | 10 | 10 | 10 | 10 | 10 | 10 | 9 | 8 | 7 | 5 | 5 | 4 | 3 | 2 | 2 | 1 | 1 | 2 | 2 | 3 | 4 |
| 160 | 10 | 10 | 10 | 10 | 10 | 9 | 9 | 7 | 6 | 5 | 4 | 3 | 2 | 1 | 0 | 0 | 1 | 2 | 2 | 3 | 3 |
| 150 | 10 | 10 | 10 | 10 | 9 | 9 | 7 | 6 | 5 | 4 | 3 | 2 | 1 | 0 | 0 | 1 | 2 | 2 | 2 | 3 | 3 |
| 140 | 10 | 10 | 10 | 9 | 9 | 8 | 6 | 5 | 4 | 3 | 2 | 1 | 0 | 0 | 0 | 1 | 2 | 2 | 3 | 4 | 4 |
| 130 | 10 | 10 | 10 | 9 | 8 | 7 | 5 | 4 | 3 | 2 | 1 | 0 | 0 | 0 | 0 | 0 | 1 | 2 | 3 | 4 | 4 |
| 120 | 10 | 10 | 9 | 9 | 8 | 5 | 4 | 3 | 2 | 1 | 0 | 0 | 0 | 0 | 0 | 0 | 1 | 2 | 3 | 5 | 5 |
| 110 | 10 | 9 | 9 | 8 | 5 | 4 | 3 | 2 | 1 | 0 | 0 | 0 | 0 | 0 | 0 | 1 | 1 | 2 | 3 | 5 | 5 |
| 100 | 9 | 8 | 8 | 5 | 4 | 3 | 2 | 1 | 0 | 0 | 0 | 0 | 0 | 0 | 0 | 1 | 2 | 3 | 4 | 5 | 5 |
| 90 | 7 | 7 | 5 | 4 | 3 | 2 | 1 | 0 | 0 | 0 | 0 | 0 | 0 | 0 | 1 | 2 | 3 | 3 | 4 | 5 | 5 |
| 80 | 5 | 6 | 4 | 3 | 2 | 1 | 0 | 0 | 0 | 0 | 0 | 0 | 1 | 1 | 2 | 3 | 3 | 4 | 5 | 5 | 5 |
| 70 | 4 | 4 | 3 | 2 | 2 | 1 | 0 | 2 | 1 | 0 | 0 | 1 | 1 | 2 | 3 | 3 | 4 | 5 | 6 | 6 | 6 |
| 60 | 4 | 3 | 2 | 2 | 1 | 0 | 1 | 2 | 2 | 1 | 1 | 1 | 2 | 3 | 4 | 4 | 5 | 5 | 6 | 7 | 7 |
| 50 | 3 | 2 | 2 | 1 | 0 | 1 | 2 | 2 | 2 | 2 | 2 | 2 | 3 | 4 | 4 | 5 | 5 | 6 | 7 | 8 | 8 |
| 40 | 3 | 3 | 2 | 2 | 1 | 2 | 2 | 2 | 2 | 2 | 3 | 3 | 4 | 4 | 4 | 5 | 6 | 7 | 8 | 8 | 8 |
| 30 | 4 | 4 | 3 | 2 | 2 | 2 | 2 | 2 | 3 | 3 | 4 | 4 | 4 | 4 | 5 | 5 | 6 | 7 | 8 | 9 | 9 |
| 20 | 5 | 5 | 4 | 3 | 2 | 2 | 3 | 3 | 3 | 4 | 5 | 5 | 5 | 5 | 6 | 6 | 7 | 8 | 9 | 10 | 10 |
| 10 | 6 | 6 | 5 | 4 | 3 | 3 | 3 | 3 | 4 | 5 | 5 | 5 | 5 | 6 | 7 | 7 | 8 | 9 | 10 | 10 | 10 |
| 0 | 7 | 6 | 5 | 4 | 3 | 3 | 3 | 4 | 4 | 5 | 5 | 5 | 6 | 7 | 7 | 8 | 9 | 10 | 10 | 10 | 10 |

ELECTRONIC CAMERA HAVING WHITE BALANCE FUNCTION

CROSS-REFERENCE TO RELATED APPLICATION

This application is based upon and claims the benefit of priority from the prior Japanese Patent Application No. 2003-002211, filed on Jan. 8, 2003, the entire contents of which are incorporated herein by reference.

BACKGROUND OF THE INVENTION

1. Field of the Invention

The present invention relates to an electronic camera having the function of preset white balance. The preset white balance described in this specification is the function of measuring the color of a light source or the like in different timing from main photography, and determining the white balance of the main photography based on measurement results.

2. Description of the Related Art

The function of preset white balance (also known as manual white balance) is known in a conventional electronic camera. The preset white balance is a mode of determining the white balance of main photography based on color information from preparatory photography, in which white paper, a subject of achromatic color or the like is photographed. Japanese Unexamined Patent Application Publication No. 2000-156869 discloses the preset white balance like this.

In the existing electronic camera, the preset white balance is carried out in the following procedure.

(1) A user takes a photograph of a white subject with the electronic camera (preparatory photography).

(2) In the electronic camera, image data of the preparatory photography is compressed and recorded on a recording medium, after being subjected to image process, as with that of main photography.

(3) The user operates a menu window of the electronic camera to select the image data of the preparatory photography out of image files recorded on the recording medium.

(4) The electronic camera obtains white balance data of the selected image data, in order to use it for white balance adjustment in main photography.

As is evident from the operation procedure having a few steps as above, the existing preset white balance is troublesome. Thus, the user has to suspend the flow of photography whenever he or she operates the preset white balance, so that there is a problem that the operability of the electronic camera is impaired.

Since the preset white balance needs the operation procedure with a few steps, and is originally used with a low frequency, it is not easy for the user to learn the operation. Therefore, there is a problem that the user cannot operate the preset white balance when the need arises.

SUMMARY OF THE INVENTION

An object of the present invention is to provide the technology of carrying out preset white balance with simple operation.

The present invention will be hereinafter described.

(1) An electronic camera according to the present invention includes an image pickup part, an ambient light colorimetric part, an operation member, a colorimetric calculation part, and a white balance adjustment part.

The image pickup part captures an image of light passing through a photo-taking lens, and generates color image data.

The ambient light colorimetric part measures the color of ambient light without passing through the photo-taking lens.

The operation member receives an instruction for a colorimetric timing of the ambient light from a user.

The colorimetric calculation part obtains a colorimetric result from the ambient light colorimetric part in synchronization with the colorimetric timing, and calculates and stores color gain which brings the colorimetric result near to achromatic color.

The white balance adjustment part carries out white balance adjustment of the image data with the use of the color gain stored in the colorimetric calculation part.

(2) It is preferable that the colorimetric calculation part holds a difference in spectral characteristics between the image pickup part and the ambient light colorimetric part as correction data. In this case, the colorimetric calculation part corrects an error occurring in the white balance adjustment in accordance with the correction data.

(3) It is preferable that the colorimetric calculation part stores respective correspondence relations between "a colorimetric result of ambient light" and "an applicability of white balance adjustment carried out based on the colorimetric result". In this case, when the colorimetric result from the ambient light colorimetric part turns out to be inadequate by referring to the correspondence relations, the colorimetric calculation part carries out "an abort of the white balance adjustment based on the ambient light" and/or gives "a warning which indicates that the ambient light is inadequate to the white balance adjustment".

(4) It is preferable that the electronic camera according to the present invention further includes a TTL photometric part for measuring luminance of light incident on the image pickup part. In this case, the colorimetric calculation part compares luminance of the ambient light received by the ambient light colorimetric part with the luminance of the light incident on the image pickup part. As a result of comparison, when a difference in the luminance is equal to or more than a predetermined threshold value, the colorimetric calculation part carries out "an abort of white balance adjustment based on ambient light" and/or gives "a warning which indicates that ambient light is inadequate to white balance adjustment".

(5) It is preferable that the electronic camera according to the present invention further includes a TTL colorimetric part for measuring color of light incident on the image pickup part. In this case, the colorimetric calculation part compares the colorimetric result of the ambient light received by the ambient light colorimetric part with a colorimetric result of the light incident on the image pickup part. As a result of comparison, when a difference in the colorimetric results is equal to or more than a predetermined threshold value, the colorimetric calculation part carries out "an abort of white balance adjustment based on ambient light" and/or gives "a warning which indicates that ambient light is inadequate to white balance adjustment".

(6) It is preferable that the colorimetric calculation part obtains a plurality of colorimetric results of the ambient light from the ambient light colorimetric part, to calculate an average value of the plurality of colorimetric results. In this case, the colorimetric calculation part obtains color gain for white balance adjustment based on the average value.

BRIEF DESCRIPTION OF THE DRAWINGS

Other and further objects, features and advantages of the invention will appear more fully from the following description.

FIG. 3 is an explanatory view showing an example of table data T; and

DESCRIPTION OF THE PREFERRED EMBODIMENT

An embodiment of an electronic camera according to the present invention will be hereinafter described with reference to the drawings.

Description of the Structure of this Embodiment

Figure 1:
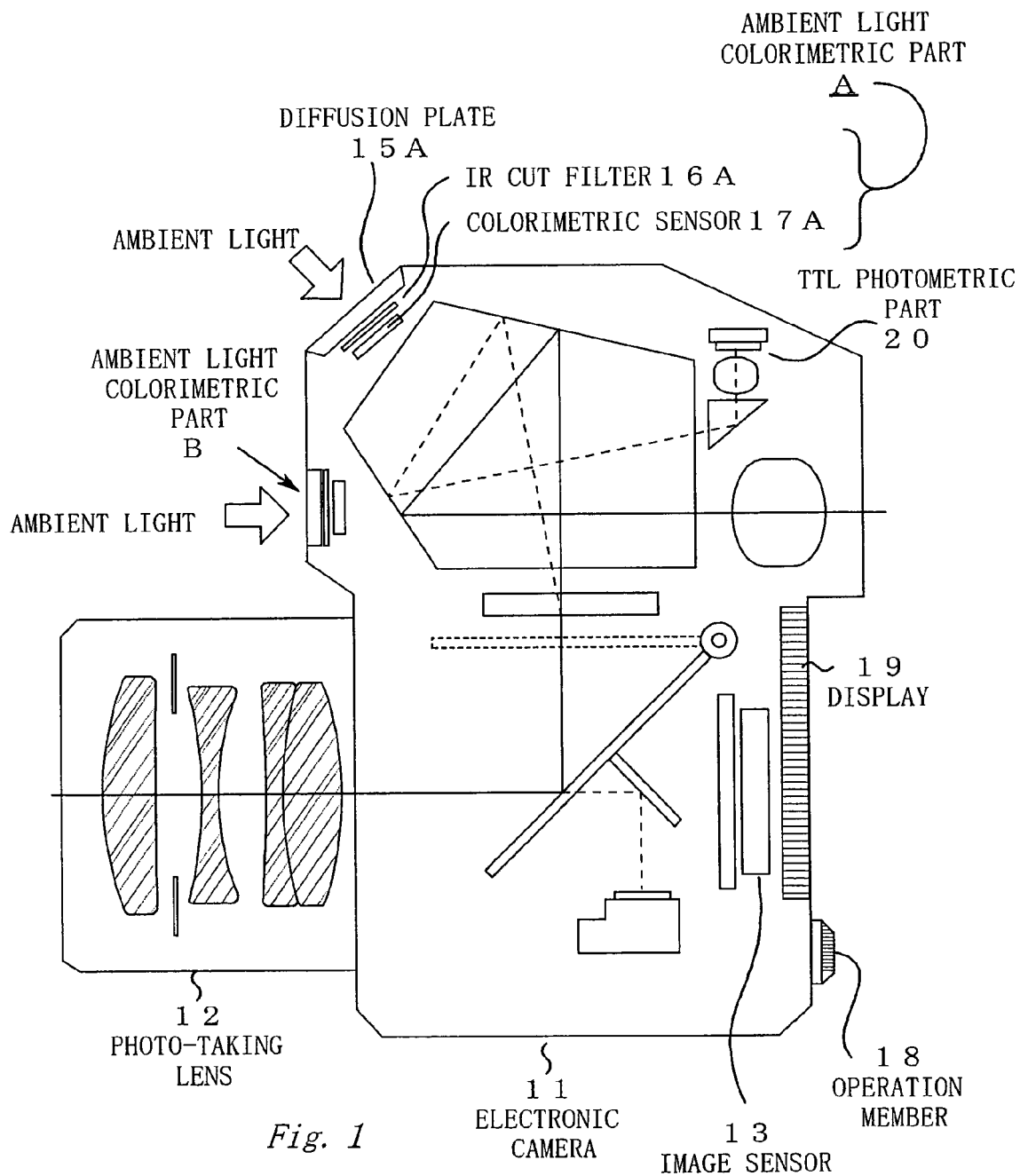
FIG. 1 is a schematic view showing the structure of an electronic camera 11 according to an embodiment of the present invention.

FIG. 1 is a schematic view showing the structure of an electronic camera 11 according to this embodiment.

Referring to FIG. 1, the electronic camera 11 is provided with a photo-taking lens 12. In the image space of the photo-taking lens 12, the imaging surface of an image sensor 13 is disposed. In the front wall of the housing of the electronic camera 11, an obliquely upward oriented ambient light colorimetric part A is disposed. The ambient light colorimetric part A includes a diffusion plate 15A, an IR cut filter 16A, and a colorimetric sensor 17A. (An ambient light colorimetric part B oriented in the direction of a subject may be disposed instead of the ambient light colorimetric part A.)

In the rear wall of the housing of the electronic camera 11, an operation member 18 and a display 19 are provided. A TTL photometric part 20 is disposed in a finder block of the electronic camera 11.

Figure 2:
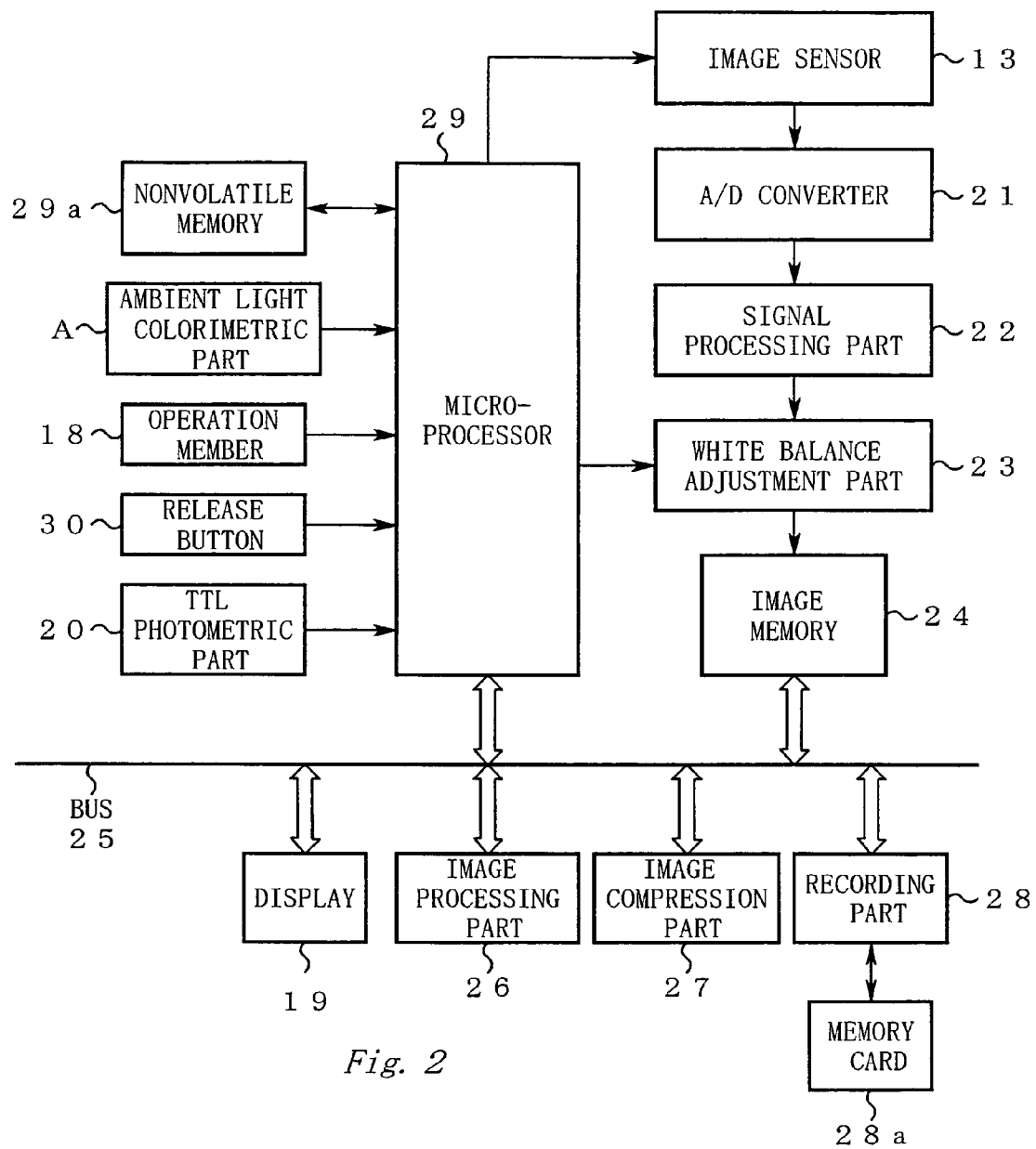
FIG. 2 is a function block diagram showing a signal processing system of the electronic camera 11.

FIG. 2 is a function block diagram showing a signal processing system of the electronic camera 11.

In FIG. 2, after an A/D converter 21 converts image data output from the image sensor 13 into digital format, digital image data is subjected to signal processing such as defective pixel correction, optical black-level correction and the like in a signal processing part 22. Then, image data is subjected to white balance adjustment in a white balance adjustment part 23, and is buffered in an image memory 24. The image memory 24 is connected to a bus 25.

An image processing part for carrying out color interpolation processing and the like, an image compression part for compressing image data, a recording part 28 for recording compressed image data on a memory card 28a, a microprocessor 29 for controlling the whole system, the display 19 and the like are also connected to the bus 25.

The ambient light colorimetric part A, the operation member 18, the TTL photometric part 20, a release button 30, and a nonvolatile memory 29a are connected to the microprocessor 29.

Correspondence to the Invention

The correspondences between the invention and this embodiment will be hereinafter described. The correspondences are just an example of interpretation for reference purpose, and do not limit the present invention.

An image pickup part described in claims corresponds to the image sensor 13 and the A/D converter 21.

An ambient light colorimetric part described in claims corresponds to the ambient light colorimetric part A.

An operation member described in claims corresponds to the operation member 18.

A colorimetric calculation part described in claims corresponds to the microprocessor 29 and the nonvolatile memory 29a.

A white balance adjustment part described in claims corresponds to the white balance adjustment part 23.

A TTL photometric part described in claims corresponds to the TTL photometric part 20.

A TTL colorimetric part described in claims corresponds to the colorimetric function of the TTL photometric part 20.

"Correction data" described in claims corresponds to a color conversion matrix M stored in the nonvolatile memory 29a.

"Correspondence relationship" described in claims corresponds to table data T stored in the nonvolatile memory 29a.

Preparation for Preset White Balance

Prior to the description of the operation of this embodiment, a method to design a color conversion matrix M and table data T prestored in the nonvolatile memory 29a will be hereinafter described.

With the use of a gray-scale pattern or the like illuminated with various light sources i (sun, fluorescent lamp, electric light bulb and the like), a colorimetric result $Si=(Ris, Gis, Bis)$ from the ambient light colorimetric part A, and an average output $Ei=(Rie, Gie, Bie)$ from the image sensor 13 are obtained.

Based on plenty of measurement data obtained like this, the elements $m_{11}$ to $m_{33}$ of the color conversion matrix M are so determined as to minimize the following evaluation value D.

$$D = \sum_i |Ei - M \cdot Si| = \sum_i^i [((Rie - (m_{11}Ris + m_{12}Gis + m_{13}Bis))^2 + \qquad (1)$$
$$((Gie - (m_{21}Ris + m_{22}Gis + m_{23}Bis))^2 +$$
$$((Bie - (m_{31}Ris + m_{32}Gis + m_{33}Bis))^2]^{1/2}$$

The color conversion matrix M determined like this is stored in the nonvolatile memory 29a, to be used for the preset white balance described later.

Then, the following deviation Di of each light source i is calculated with the use of the color conversion matrix M.

$$Di = |Ei - M \cdot Si| = [((Rie - (m_{11}Ris + m_{12}Gis + m_{13}Bis))^2 + \qquad (2)$$
$$((Gie - (m_{21}Ris + m_{22}Gis + m_{23}Bis))^2 +$$
$$((Bie - (m_{31}Ris + m_{32}Gis + m_{33}Bis))^2]^{1/2}$$

The deviation Di indicates applicability to the white balance adjustment based on the colorimetric result Si. Relating the deviation Di to the chromaticity coordinates (Ris/Gis, Bis/Gis) of the colorimetric result Si, table data T is created. Table data T is stored in the nonvolatile memory 29a to be used for the preset white balance described later.

FIG. 3 shows an example of table data T created as above. In table data T, values 0 to 10 which rate the deviations Di on a scale are recorded in order to simplify the following judgment processing.

Description of the Operation of this Embodiment

Figure 4:
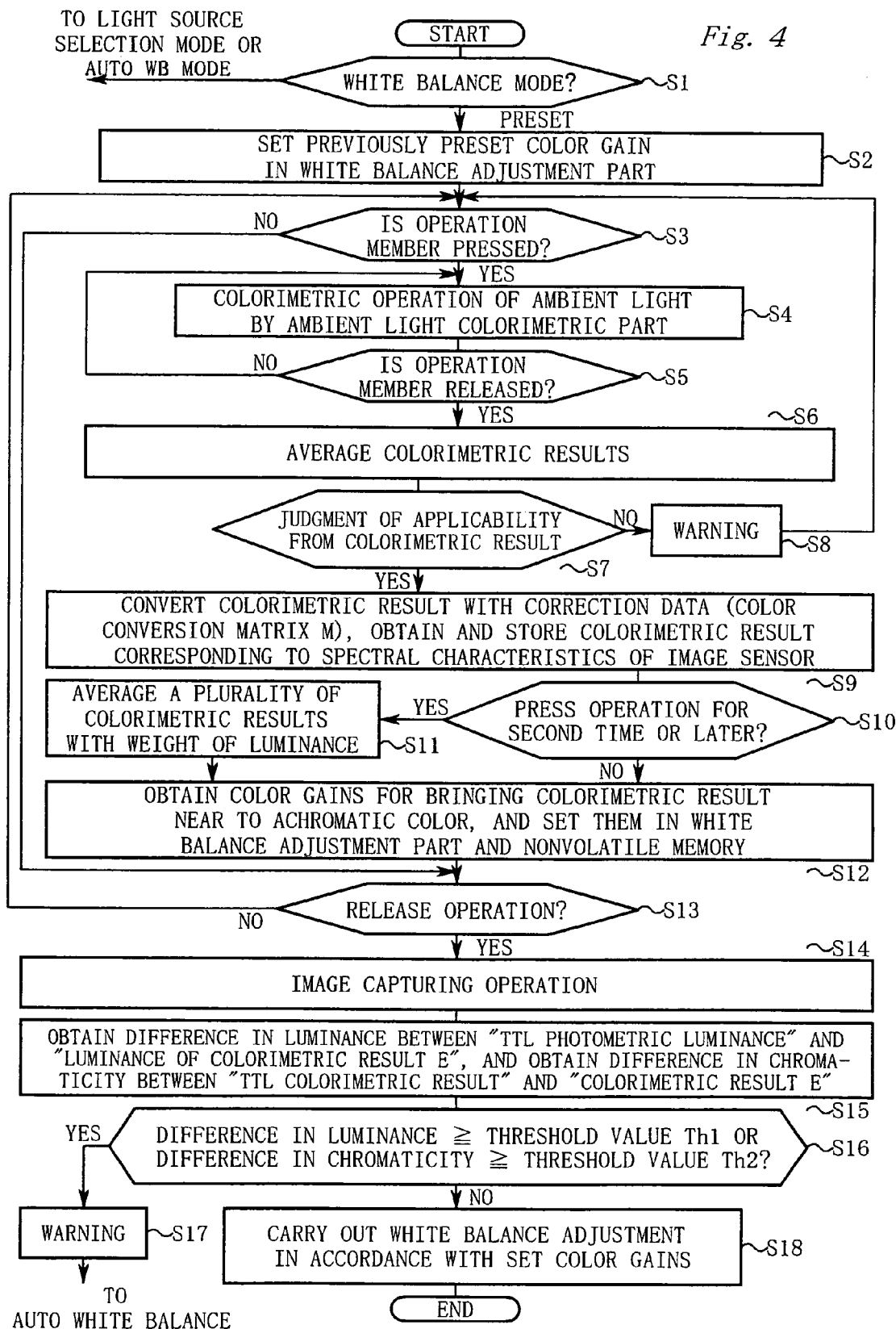
FIG. 4 is a flow chart of preset white balance processing.

Next, the operation of this embodiment will be described. FIG. 4 is a flow chart of preset white balance processing which the electronic camera 11 carries out. The operation will be hereinafter described along step numbers shown in FIG. 4.

Step S1: The microprocessor 29 discriminates a white balance mode which is selected and set in advance by a user.

When a preset white balance mode is set, the microprocessor 29 advances the operation to step S2.

When another white balance mode (an auto white balance mode, a light source selection mode or the like) is selected and set, on the other hand, the microprocessor 29 advances the operation to the processing routine of the corresponding white balance mode.

Step S2: The microprocessor 29 reads color gains used in a previous preset white balance from the nonvolatile memory 29a, to set it in the internal register of the white balance adjustment part 23 as initial values.

Step S3: The microprocessor 29 judges the state of switching of the operation member 18.

At this point, when the operation member 18 is pressed, the microprocessor 29 judges that the user has entered the colorimetric timing of ambient light, and the operation is advanced to step S4.

When the operation member 18 is not pressed, on the other hand, the microprocessor 29 advances the operation to step S11 without carrying out the colorimetric operation from step S4 onward.

Step S4: The diffusion action of the diffusion plate 15A averages ambient light incident on the ambient light colorimetric part A, so that a light-source color is reflected into the ambient light. The ambient light is incident on the colorimetric sensor 17A, after the IR cut filter 16A eliminates infrared rays therefrom. The colorimetric sensor 17A outputs the colorimetric values Rs, Gs, and Bs of three colors (RGB) as a colorimetric result S.

The microprocessor 29 obtains the colorimetric result S=(Rs, Gs, Bs) to store it on the internal memory of the microprocessor 29.

Step S5: The microprocessor 29 judges whether or not the operation member 18 is released from a press.

When the operation member 18 is pressed continuously, the microprocessor 29 returns the operation to step S4, in order to repeat the colorimetric operation of ambient light. By this operation, a plurality of colorimetric results S is successively recorded on the internal memory, while the operation member 18 is pressed.

When the operation member 18 is released from the press, on the other hand, the microprocessor 29 advances the operation to step S6.

Step S6: The plurality of colorimetric results S during one-press period of the operation member 18 is averaged.

Step S7: The microprocessor 29 compares the chromaticity coordinates (Rs/Gs, Bs/Gs) of the averaged colorimetric result S with the table data T stored in the nonvolatile memory 29a, to obtain the evaluation value of the deviation Di.

When the evaluation value is equal to or less than a predetermined threshold value (for instance, 4), it is judged that this colorimetric result S is adequate to the preset white balance. In this case, the microprocessor 29 advances the operation to step S9.

When the evaluation value exceeds the predetermined threshold value (for instance, 4), on the other hand, it is judged that the colorimetric result S of this time is inadequate to the preset white balance. In this case, the microprocessor 29 advances the operation to step S8.

Step S8: Step S8 is in a case where the colorimetric result S of the ambient light is judged inadequate. In this case, the microprocessor 29 displays a warning which indicates that "the ambient light is inadequate to the white balance adjustment" in the display 19. Then, the microprocessor 29 returns the operation to step S3, in order to abort the white balance adjustment based on the colorimetric result S of this time.

Step S9: The microprocessor 29 reads the color conversion matrix M from the nonvolatile memory 29a to calculate the following equation.

$$\begin{pmatrix} Re \\ Ge \\ Be \end{pmatrix} = \begin{pmatrix} m_{11} & m_{12} & m_{13} \\ m_{21} & m_{22} & m_{23} \\ m_{31} & m_{32} & m_{33} \end{pmatrix} \begin{pmatrix} Rs \\ Gs \\ Bs \end{pmatrix} \quad (3)$$

By this calculation, the colorimetric result S=(Rs, Gs, Bs) is corrected, and is converted into a colorimetric result E=(Re, Ge, Be) which conforms to the spectral characteristics of the image sensor. The microprocessor 29 stores the colorimetric result E on the internal memory.

Step S10: In this embodiment, as described later, it is possible to carry out the press (preset) operation of the operation member 18 any number of times, until a release operation is done.

Accordingly, in step S10, the microprocessor 29 judges whether or not the current press (preset) operation is for the second time or later.

If the current press operation is for the second time or later, the microprocessor 29 advances the operation to step S11, to average the colorimetric results E of plural times with weight.

When the current press operation is for the first time, on the other hand, the microprocessor 29 advances the operation to step S12.

P Step S11: The microprocessor 29 reads each of the colorimetric results E from the internal memory, and calculates the luminance Y of each colorimetric result E.

$$Y=0.3Re+0.6Ge+0.1Be \quad (4)$$

In the equation (4), it is preferable that coefficients are determined in accordance with the ratio of the relative luminous efficiency of RGB components of the image sensor 13 (or the ambient light colorimetric part A).

The microprocessor 29 averages the RGB color components of every colorimetric result E with the use of the luminance Y of each photometric result E as a weighting factor.

A comprehensive colorimetric result to which every colorimetric result E is reflected is calculated by the weighted average. The microprocessor 29 substitutes the comprehensive colorimetric result for the colorimetric result E, and advances the operation to step S12.

Step S12: The microprocessor 29 calculates color gains which bring the colorimetric result E=(Re, Ge, Be) near to achromatic color. The following equations are one example of calculation for obtaining the color gains like that.

$R$ color gain=Ge/Re $B$ color gain=Ge/Be     (5)

The microprocessor 29 transfers obtained color gains to the white balance adjustment part 23. The white balance adjustment part 23 overwrites old color gains held in the internal register with latest ones.

The microprocessor 29 overwrites old color gains stored in the nonvolatile memory 29a with latest ones, so that obtained color gains are used as the initial values for the next preset white balance.

Step S13: The microprocessor 29 judges whether or not the release button 30 is operated (fully pressed).

When the release button 30 is operated, the microprocessor 29 moves into the image capturing operation of step S14.

When the release button 30 is not operated, on the other hand, the microprocessor 29 returns the operation to step S3. According to this action, it is possible to repeat the colorimetric (preset) operation plural numbers of times, until release operation is carried out.

Step S14: The microprocessor 29 determines an exposure condition based on photometric luminance by the TTL photometric part 20. The microprocessor 29 controls the drive of the image sensor 13 in accordance with the exposure condition, after a mirror moves upward.

Step S15: The microprocessor 29 calculates a difference in luminance between "the photometric luminance by the TTL photometric part 20" and "the luminance Y of the colorimetric result E".

Furthermore, the microprocessor 29 calculates a difference in chromaticity between "a colorimetric result from the TTL photometric part 20" and "the colorimetric result E".

Step S16: The microprocessor 29 compares the difference in luminance with threshold values, and compares the difference in chromaticity with threshold values.

When the difference in luminance is equal to or more than a threshold value Th1, or the difference in chromaticity is equal to or more than a threshold value Th2, the microprocessor 29 advances the operation to step S17.

When the difference in luminance is less than the threshold value Th1, and the difference in chromaticity is less than the threshold value Th2, the microprocessor 29 advances the operation to step S18.

It is preferable that the threshold values Th1 and Th2 are so determined that the rate of failure in the preset white balance adjustment is within the allowable level of the user.

Step S17: In step S17, the preset white balance adjustment is judged inadequate, because the luminance or chromaticity of the colorimetric result E of the ambient light is significantly different from an actual captured image. In this case, the microprocessor 29 displays a warning which indicates that "the ambient light is inadequate for the white balance adjustment" in the display 19. Then, the microprocessor 29 aborts the preset white balance, and carries out auto white balance processing. The description about the auto white balance processing is omitted, because it is publicly known.

Step S18: In step S18, the preset white balance adjustment is judged usable without any problem, because the luminance or chromaticity of the colorimetric result E of the ambient light is not widely different from the captured image. In this case, the white balance adjustment part 23 subjects captured image data to the white balance adjustment, in accordance with color gains held in the internal register.

After the foregoing operation, image data subjected to the white balance adjustment is subjected to color interpolation processing and image compression processing, and then is recorded on the memory card 28a by the recording part 28.

Effect of this Embodiment

Since the electronic camera 11 according to this embodiment is provided with the ambient light colorimetric part A, there are less constraints of colorimetric timing as compared with TTL (Through The Lens) colorimetric operation. Therefore, it is possible to carry out the colorimetric operation in freer timing than a conventional art.

Since the electronic camera 11 according to this embodiment is provided with the ambient light colorimetric part A, preparatory photography described in the conventional art is not necessary, so that it is possible to omit the processing and recording operation of an image captured in the preparatory photography.

Furthermore, the electronic camera 11 according to this embodiment, in contrast with the conventional art, does not need to record preparatory captured image data. Thus, the available storage space of the memory card 28a is not wasted.

Since the electronic camera 11 according to this embodiment is provided with the operation member 18 for exclusive use in preset, the user can easily carry out the colorimetric operation only by facing the ambient light colorimetric part A to a proper direction, and pressing the operation member 18.

The electronic camera 11 according to this embodiment corrects the colorimetric result from the ambient light colorimetric part A in accordance with the spectral characteristics of the image sensor 13 with the use of the color conversion matrix M as correction data. Therefore, it is possible to properly correct an error in the white balance adjustment, which is ascribable to difference in the spectral characteristics between the ambient light colorimetric part A and the image sensor. As a result, it is possible to achieve the preset white balance adjustment with high precision, even though a colorimetric device different from the image sensor 13 is used.

In the electronic camera 11 of this embodiment, the correspondence relations between "the colorimetric results of ambient light" and "the applicability of white balance adjustment carried out based on each colorimetric result" are prestored in table data T. Thus, by comparing a colorimetric result with the table data T, whether the colorimetric result is adequate to the white balance or not is judged immediately. As a result, it becomes possible to previously warn about or prevent a white balance adjustment carried out with reference to ambient light biased toward a particular color.

Besides, in the electronic camera 11 of this embodiment, the luminance of ambient light received by the ambient light colorimetric part A is compared with the luminance of light incident on the image sensor 13 (TTL photometric luminance), to determine the applicability of the preset white balance. Therefore, it is possible to warn about or prevent a situation where the white balance adjustment is carried out with respect to ambient light significantly different from a subject image to be captured.

Furthermore, in the electronic camera 11 of this embodiment, the colorimetric result from the ambient light colorimetric part A is compared with the colorimetric result of light incident on the image sensor 13, to determine the applicability of the preset white balance. As a result, it is possible to warn about or prevent a situation where the white balance adjustment is carried out with respect to ambient light significantly different from a subject image to be captured.

The electronic camera 11 according to this embodiment obtains a plurality of colorimetric results S, and calculates the average value thereof. The colorimetric result S averaged like this has low noise, so that the preset white balance adjustment is carried out with high precision.

The electric camera 11 according to this embodiment successively obtains a plurality of colorimetric results S while the operation member 18 is operated. Thus, a user can control the number of samplings of the colorimetric results S by changing an operation period of the operation member 18. As a result, it is possible to significantly decrease noise in the colorimetric result with ease by extending the operation period of the operation member 18 in dark conditions.

The electronic camera 11 of this embodiment averages every colorimetric result with weight of luminance, when the preset operation is carried out plural times. Accordingly, in a complex illuminated condition such as cocktail lighting and lighting near the window (the mixture of sunshine and room light), it is possible to carry out colorimetry at many points. Since colorimetric results at many points are averaged with the weight of luminance, a proper colorimetric result is obtained in consideration of the balance of quantity of light from a plurality of light sources. Therefore, it is possible to further increase precision in the preset white balance under the plurality of light sources.

In the electronic camera 11 according to this embodiment, the ambient light colorimetric part A is oriented obliquely upward in the direction of a subject. Thus, the color of light from a light source which is above the subject is properly measured, so that the possibility of carrying out the proper preset white balance is increased.

In the electric camera 11 according to this embodiment, when the ambient light colorimetric part B is used instead of the ambient light colorimetric part A, it is possible to measure the color of light direct from a subject. In this case also, the possibility of carrying out the proper preset white balance is increased.

Supplemental Remarks on this Embodiment

In the foregoing embodiment, the present invention is applied to a single-lens reflex electronic camera. However, the present invention is not limited thereto, and may be applied to a compact electronic camera.

In the compact electronic camera like this, image data used for monitor display, AF control, or exposure control (hereinafter called "monitor images") is taken at regular intervals. In this case, comparing "the average luminance of the monitor images" with "the luminance conversion value of a colorimetric result of ambient light" makes it possible to judge the applicability of the preset white balance. According to the judgment of applicability like this, it becomes possible to warn about or prevent a situation where the white balance adjustment is carried out with respect to ambient light significantly different from a subject image to be captured.

By comparing "the average color of the monitor images" with "the colorimetric result of ambient light", the applicability of preset white balance may be judged. According to the judgment of applicability like this, it becomes possible to warn about or prevent a situation where the white balance adjustment is carried out with respect to ambient light significantly different from a subject image to be captured.

Furthermore, in the foregoing embodiment, the electronic camera 11 may be provided with a device for compulsorily switching from the other white balance modes to the preset white balance mode, when the operation of the operation member 18 is detected. In this case, even when the electronic camera 11 is in a mode other than the preset white balance mode, it immediately starts the colorimetry of ambient light by operating the operation member 18, and then the preset white balance can be smoothly carried out. Therefore, the operation of the preset white balance becomes even further easier.

When a mode is changed compulsorily like this, it is preferable that the electronic camera 11 returns to the previous white balance mode, after one or a predetermined number of times of main photography (or after the expiration of predetermined time). According to the operation of the camera like this, the user can very easily use the preset white balance in accordance with the intention of photography at any time.

The plural colorimetric operations can detect flicker. When the flicker is large (when the amplitude of intensity is larger than a predetermined threshold or the like), it is preferable that whether or not to abort the preset white balance adjustment with ambient light is warned. The type of a lamp such as a fluorescent lamp may be identified by the flicker (for example, the period of light and dark), and white balance adjustment corresponding to the fluorescent lamp may be carried out.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An electronic camera comprising:
    an image pickup part for capturing an image of light passing through a photo-taking lens to generate color image data;
    an ambient light colorimetric part for measuring color of ambient light without passing through said photo-taking lens;
    a colorimetric calculation part for obtaining a colorimetric result from said ambient light colorimetric part, for calculating color gain that brings said colorimetric result near achromatic, and for storing said color gain; and
    a white balance adjustment part for carrying out white balance adjustment of said image data with the use of said color gain stored in said colorimetric calculation part; wherein
    said image pickup part, said ambient light colorimetric part, said colorimetric calculation part and said white balance adjustment part are disposed in a same housing, in which
    said colorimetric calculation part pre-stores respective correspondence relations between a colorimetric result of ambient light and an applicability of white balance adjustment carried out based on the colorimetric result, and
    when said colorimetric result from said ambient light colorimetric part turns out to be inadequate by referring to said correspondence relations said colorimetric calculation part carries out an abort of said white balance adjustment based on said ambient light and/or gives a warning which indicates that said ambient light is inadequate to said white balance adjustment.

2. The electronic camera according to claim 1, wherein
    said colorimetric calculation part holds a difference in spectral characteristics between said image pickup part and said ambient light colorimetric part as correction data, to correct an error occurring in said white balance adjustment in accordance with said correction data.

3. The electronic camera according to claim 1, further comprising a TTL photometric part for measuring luminance of light incident on said image pickup part, and wherein said colorimetric calculation part compares luminance of said ambient light received by said ambient light colorimetric part with the luminance of said light incident on said image pickup part, and when a difference in said luminance is equal to or more than a predetermined threshold value, said colorimetric calculation part carries out the abort of the white balance adjustment based on the ambient light and/or gives the warning which indicates that the ambient light is inadequate to the white balance adjustment.

4. The electronic camera according to claim 1, further comprising a TTL colorimetric part for measuring color of light incident on said image pickup part, and wherein said colorimetric calculation part compares the colorimetric result of said ambient light received by said ambient light colorimetric part with a colorimetric result of said light incident on said image pickup part, and when a difference in said colorimetric results is equal to or more than a predetermined threshold value, said colorimetric calculation part carries out the abort of the white balance adjustment based on the ambient light and/or gives the warning which indicates that the ambient light is inadequate to the white balance adjustment.

5. The electronic camera according to claim 1, wherein said colorimetric calculation part obtains a plurality of colorimetric results of said ambient light from said ambient light colorimetric part to calculate an average value of said plurality of colorimetric results, and obtains color gain for white balance adjustment based on said average value of the colorimetric results.

6. The electronic camera according to claim 1, wherein said ambient light colorimetric part is disposed to orient obliquely upward on a front wall of said housing.

* * * * *